(12) United States Patent
Brucker

(10) Patent No.: US 6,379,597 B1
(45) Date of Patent: Apr. 30, 2002

(54) ORNAMENTAL MOLDING AND METHOD OF MAKING THE SAME

(76) Inventor: Isidor Brucker, 424 Winton Pl. South, Memphis, TN (US) 38117

( * ) Notice: Subject to any disclaimer, the term of this patent is extended or adjusted under 35 U.S.C. 154(b) by 0 days.

(21) Appl. No.: 09/228,713

(22) Filed: Jan. 12, 1999

(51) Int. Cl.[7] ............................................. B29C 47/02
(52) U.S. Cl. .................... 264/177.1; 264/240; 264/320
(58) Field of Search ................................ 428/462, 318.6, 428/192, 182; 264/321, 171.1, 177.1, 240, 320; 156/244.12; 427/256, 358, 356

(56) References Cited

U.S. PATENT DOCUMENTS

| | | | | |
|---|---|---|---|---|
| 2,368,085 A | * | 1/1945 | Barbieri | 41/24 |
| 2,404,073 A | * | 7/1946 | Karfiol | 41/33 |
| 3,753,285 A | * | 8/1973 | Gewertz | 29/425 |
| 4,462,176 A | * | 7/1984 | Schovee | 40/154 |
| 5,450,702 A | * | 9/1995 | Barnett | 52/656.2 |
| 5,508,103 A | * | 4/1996 | Cope | 428/318.8 |

* cited by examiner

*Primary Examiner*—Merrick Dixon
(74) *Attorney, Agent, or Firm*—Fulbright & Jaworski L.L.P.

(57) ABSTRACT

In a method of making a molding, a fiberboard substrate and a decorative paste composition are provided, and then the decorative paste composition is set to a surface of the fiberboard substrate. The paste composition is applied to a surface of the fiberboard substrate when the paste composition is at ambient temperature and, then a mechanical roller such as a design or laminating roller is used to press the paste composition against the surface of the fiberboard substrate. Using such a design roller, an ornamentation is produced on the outer surface of the paste composition. The ingredients for the paste composition include a quantity of polyvinyl acetate and a quantity of fillers, such as wood fillers and shell fillers. These and other ingredients are then, mixed together under ambient conditions to produce a decorative paste composition that exhibits stretchability, pliability and adhesive properties. The paste composition also exhibits a wood grain appearance.

27 Claims, 1 Drawing Sheet

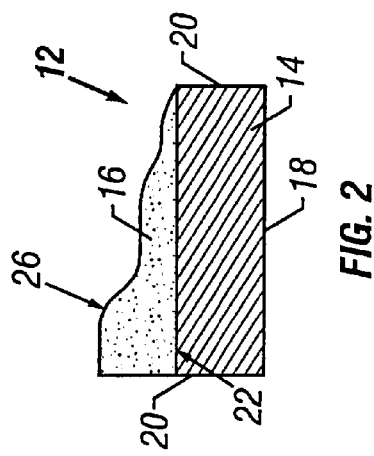
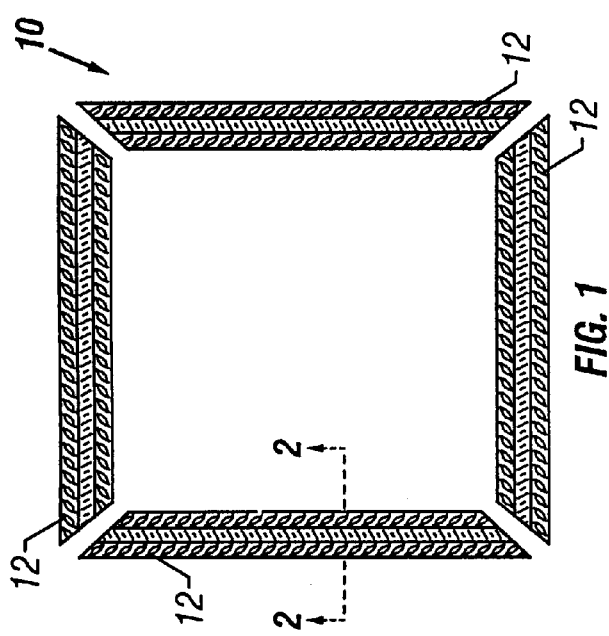
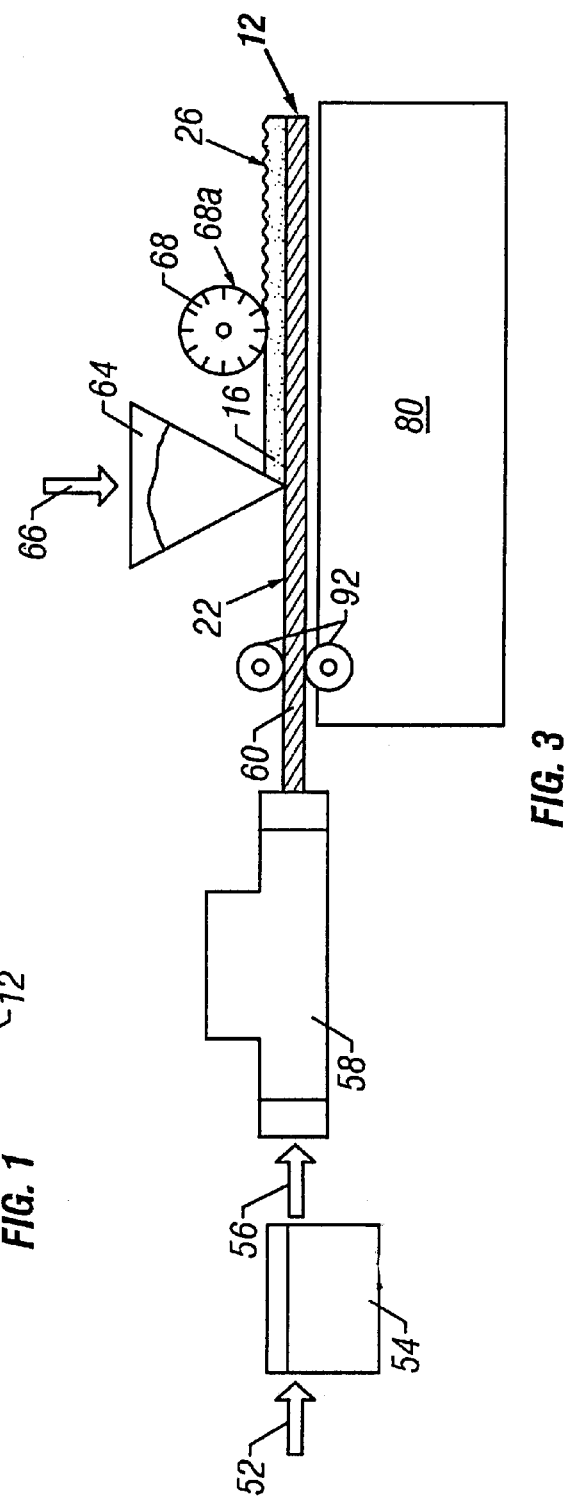

ORNAMENTAL MOLDING AND METHOD OF MAKING THE SAME

BACKGROUND OF THE INVENTION

The present invention relates generally to moldings and, more particularly, to a decorative or ornamental molding used in forming a frame or a trim, and a method for making such a molding.

It is popular practice to provide a frame around pictures, paintings, windows, doors, mirrors and the like. It is also popular practice to provide trims on furniture, cabinets, and as borders or crown moldings near the interface of adjacent walls, a wall and a ceiling, and a wall and a floor. The frames and trims are generally formed from one or more molding strips or moldings. The frames and trims in these examples may perform a structural function and\or a housekeeping function (e.g., covering up unattractive areas). In all cases, however, the frames and trims are also intended to be visually appealing. Moreover, such frames and trims are designed to complement, present and visually enhance the item that is on display and next to which the frame or molding is positioned.

To this end, moldings have been made from wood products and used to form ornamental frames and trims. In particular, it is popular to provide a frame or trim constructed of one of a variety of wood, including pine and oak. More costly frames may include detailed hand carvings and other ornamentation on the molding. Some metals (e.g., aluminum) have also been shaped to form a frame or a trim; although, in many instances, a metallic strip is attached to a wood base molding to form a composite frame or trim. More recently, some picture frames have been formed using moldings made of thermoplastic resins. In such frames, the thermoplastic resin may be embossed, carved or otherwise altered to produce an ornamental surface thereon.

One disadvantage with traditional moldings is that the raw materials for the frames and trims described above can be expensive. Moreover, the process of carving a detailed ornamental design on a solid wood product or etching a similar design on thermoplastic or metal is time consuming. Thus, the high volume manufacture of decorative or ornamental moldings, and frames and trims utilizing such moldings, can be inefficient and costly.

SUMMARY OF THE INVENTION

It is, therefore, a principal object of the present invention to provide an alternative to traditional moldings, frames and trims made from solid wood products, metals, and\or thermoplastics. It is also a principal object of the present invention to provide an alternate method of making or manufacturing such moldings, frames and trims.

In a method of making a molding, according to the present invention, a fiberboard substrate and a decorative paste composition (i.e., "compo") are provided, and then the decorative paste composition is set to a surface of the fiberboard substrate. Preferably, the paste composition is applied to a surface of the fiberboard substrate when it is at ambient temperature and, then a mechanical roller, such as a design or laminating roller, is used to press the paste composition against the surface of the fiberboard substrate. Using such a design roller, an ornamentation such as a decorative design and\or profile may be produced on the outer surface of the paste composition.

In one embodiment, the fiberboard substrate is formed substantially of medium-density fiberboard materials. The fiberboard materials are fed to a molder to produce an elongated fiberboard member having a desired shape. Then, the elongated fiberboard member is extruded, so as to apply a whiting (e.g., a calcium carbonate coating) on its outer surfaces. The extrusion step dresses the surfaces of the fiberboard member and also advantageously prepares the particular surface on which the paste composition is to be applied.

The ingredients for the paste composition preferably includes a quantity of polyvinyl acetate and a quantity of fillers. The fillers may be wood fillers, shell fillers, or other fillers adapted for the particular application. These and other ingredients are mixed together under ambient conditions to produce a decorative paste composition that exhibits stretchability, pliability and adhesive properties.

In another aspect of the invention, an ornamental molding is disclosed having a construction which includes a fiberboard substrate (preferably medium density fiberboard) and a paste composition adhered to a surface of the fiberboard substrate. The paste composition has an outer surface that exhibits an ornamentation (e.g., a design and\or profile). In one embodiment, the paste composition exhibits a wood grain appearance and is formed from a mixture including polyvinyl acetate and wood or shell fillers. In another embodiment, the fiberboard substrate is an elongated extruded member and\or is molded substantially from medium-density fiberboard materials.

It is a feature and an advantage of the invention to provide a molding, frame, or trim that is relatively inexpensive to manufacture.

It is a feature and an advantage of the present invention to provide a molding, frame, or trim that is environmentally safe.

It is a feature and an advantage of the present invention to provide a method for making a molding that is ornamental, decorative and aesthetically pleasing.

It is a feature and an advantage of the present invention to provide a molding and method that are applicable to the forming of frames, trims and the like.

It is a feature and an advantage of the present invention to provide a molding and a method of forming the molding that is particularly adapted to high volume manufacturing processes.

It is a feature and an advantage of the present invention to provide a method of manufacturing a decorative molding that is simple and efficient.

It is a feature and an advantage of the present invention to provide a method of manufacturing an ornamental molding that is equally adapted for the forming of picture frames, window frames, mirror frames, and door frames, or for use as ornamental trims for furniture, cabinets, or borders and panels for walls, ceilings and floors.

BRIEF DESCRIPTION OF THE DRAWINGS

The present invention will now be described in more detail with reference to the accompanying drawings, in which:

FIG. 1 is a plan view of a frame according to the invention;

FIG. 2 is a cross-sectional view along lines 2—2 in FIG. 1; and

FIG. 3 is a schematic illustration of a process of making a molding according to the invention.

DETAILED DESCRIPTION OF THE DRAWINGS

FIG. 1 depicts a frame 10 embodying the invention. The frame 10 has a generally rectangular construction and exhibits a solid, woodgrain appearance. Frame 10 is particularly adapted for use as a picture frame, a mirror frame, a door frame, a window frame, and the like. However, the present invention should not be limited to the frames, structures or processes disclosed herein. For example, a molding according to the invention may be used as an ornamental trim for furniture, cabinets, as wall borders, as crown moldings, as backing for plaques and the like. It will be apparent to one skilled in the art, upon reading the description and viewing the drawings, that the present invention may be adapted to such other structures and methods and processes for making such structures.

The frame 10 is constructed from four elongated molding strips 12 which are joined together at their respective ends by conventional adhesive or mechanical means Referring to the cross-sectional view of FIG. 2, each molding strip 12 is a two-piece construction including a fiberboard substrate 14 and a decorative composition layer 16 applied to the fiberboard 14. The fiberboard substrate 14 (hereinafter "fiberboard") has a back surface 18, side surfaces 20, and a front surface 22. The decorative composition layer 16 is applied to substantially all of the front surface 22. Thus, when the frame 10 is used to hold a picture, for example, and hung on a wall, the woodgrain appearance of the composition layer 16 is observable.

It is to be understood, however, that the fiberboard 12 may be formed with various profiles, as is necessary to exhibit the desired ornamentation and remain practical. For example, the fiberboard 12 may include an upwardly extending portion that forms the outside edge or border of the molding strip. In such a case, the exposed portion may be coated appropriately to display an aesthetically or artistically pleasing appearance.

"Fiberboard" is an engineered wood product made from refined wood fiber and other scrap wood. Such wood products are ground and then glued together to form wood composition mats or panels, typically using multi-opening end/or continuous pressing processes. The wood composition panels are commercially available and are produced in a wide range of densities, thicknesses, panel widths and lengths. In the preferred embodiment of the invention, the fiberboard 12 is formed substantially from medium density fiberboard materials. Medium density fiberboard (generally known as "MDF") is particularly adapted for the present application because it provides an optimum combination of low cost, availability, and structural strength. On the other hand, it is to be understood that the method and product according to the invention and as described herein, are equally adapted to utilizing and/or incorporating other types of fiberboard and fiberboard of various densities.

A primary advantage to using commercially available fiberboard is that, in comparison to solid wood products, metals, and thermoplastics, it is inexpensive to use as a molding substrate. As utilized in the invention, the fiberboard also provides the requisite structural stability and strength required of a frame 10 or trim. Moreover, fiberboard is a wood product and, thus, considered environmentally friendly.

The composition layer 16 of the invention has an outer surface 26 that is aesthetically pleasing and complements the painting, decoration, or other display maintained within the frame 10. The composition layer 16 is preferably produced from a mixture of ingredients that results in a slurry-like or paste-like composition commonly referred to in the art as "compo". Hereinafter and for purposes of description, the term "paste composition" shall mean any paste-like composition including putty, slurry, wood paste and the like, that may be applied to a surface in a pliable and\or stretchable state and has certain adhesive attributes which allow it to adhere to the surface as it dries. Typically, such a paste composition is first applied as a soft, moist and often smooth-textured substance.

One aspect of the invention is that the outer surface 26 of the composition layer 16 exhibits a woodgrain appearance similar to that exhibited by a solid wood product. As shown in the drawings, the composition layer 16 is applied to the front surface 22 of the fiberboard 14. As will be further described below, the composition layer 16 also exhibits properties which allow it to adhere to the profile and/or configuration of the front surface 22 on which it is applied.

In one suitable formula for the composition, the ingredients for the mixture include the following: polyvinyl acetate ("PVA"), toluene, acetone, fillers and whiting (e.g., calcium carbonate). Light mineral oil may also be added. An alternate waterbased formula includes PVA, fillers, whiting and water. In either formula, the polyvinyl acetate provides for the adhesive property of the composition, and allows the composition to adhere to the front surface 22. The amount of PVA in the mixture should be sufficient to give the composition its desired adhesive property. However, applicant notes that the inclusion of an excessive amount of PVA in the mixture will promote cracking and shrinkage in the composition. The inclusion of fillers in the composition will, to some extent, offset the tendency of the PVA to promote cracking and shrinkage in the composition. The fillers, however, function primarily to give the composition a desired decorative or ornamental texture (e.g., a woodgrain appearance).

Different types of fillers are known in the art and most of these are suitable for the present application. Applicant has discovered, however, that certain wood fillers and shell fillers provide desirable results.

It is contemplated that one of ordinary skill in the art will arrive at the optimum amounts of PVA and fillers to be included in the mixture, through experimentation, past experience and\or particular tastes.

All of the ingredients of the composition are preferably mixed together in a conventional 55 gallon mortar/plastic mixer or bread mixer under ambient conditions. The ingredients are mixed until a paste-like form is obtained that is stretchable and pliable. Because mixing of the ingredients is performed without the addition of heat, the mixing of the ingredients, according to the invention, may be referred to as a "cold application." It should be understood, however, that the ornamental molding, in general, and the paste-like composition, more specifically, both according to the invention, may also be formed by processes wherein a "hot composition" is applied to the fiberboard. One suitable "hot composition" uses ground animal glue, water and fillers as primary ingredients.

Now with reference to FIG. 3, a suitable process for making a frame molding according to invention will be described. Typically, the fiberboard is received in panels varying in widths, thicknesses, and lengths. These panels are ripped using a gang rip to form fiberboard material 52 which provide the feed source of molder 54.

The fiberboard material 52 is run through molder 54 to produce a profiled molding 56 having a desired profile. For molding strips, the widths of the profiled molding 56 is typically between ½" to 4". The profiled molding 56 is then fed through extruder 58, which applies a coating on the outer surfaces of the profiled molding 56. The extruder 58 may be provided with plates which "squeegee" the outer surfaces of the profiled fiberboard 56 to smooth out the outer surfaces and then apply the coating. In one process, a coating of whiting such as calcium carbonate is applied. In some applications, it may be desirous or necessary to run the profiled molding 56 through the extruder 58 a plurality of runs (e.g., 4–8 times), in order to obtain the desired smoothness.

The application of a coating is particularly desirable over the surfaces of the fiberboard which are intended to be observable (i.e., when the frame or trim is used). Moreover, the extrusion step provides a smooth front surface of the fiberboard that is particularly conducive to receiving the composition. Nevertheless, in alternative embodiments, especially wherein the composition is applied over most of the otherwise exposed outer surfaces of the fiberboard 12, the extrusion step may be eliminated or substituted.

Referring again to FIG. 3, coated fiberboard substrate 60 exits the extruder 58 and is directed by pullers 92 along a linear path and toward a composition application station 80. The coated fiberboard substrate 60 is directed along a linear path. A hopper 64 is positioned above and proximate to the path, and is operable to feed a paste composition 66 through a template (not shown) and onto the coated fiberboard substrate 60. As illustrated in FIG. 3, the paste composition 66 is deposited along front surface 22 of the coated fiberboard substrate 60 and, immediately thereafter (downstream), the composite of the coated fiberboard substrate 60 and the paste composition 66 is conveyed underneath a mechanical roller 68. Preferably, the mechanical roller 68 is a design roller or laminate roller, that is generally 6" to 12" in diameter and has an outer contact surface 68a having a relief or design profile. The design roller 68 is rotated to contact and apply pressure to the paste composition 66 in the direction of the front surface 22. As a result, the paste composition 66 adheres to the front surface 22, and at the same time, a design pattern associated with the contact surface 68a is stamped, embedded, or otherwise created as ornamentation on the outer surface 26 of decorative paste composition 16.

In an alternative embodiment, a screw auger may be used, in lieu of the hopper 64, to feed the paste composition underneath thee design roller 68. Furthermore, design roller 68 may be replaced by or supplemented with other embedding or etching components known in the art. For example, a stamper may be used instead of design roller 68. Further, the ornamentation may be applied in a step or process other than the mechanical pressing described above. For example, an embossing station may be employed to emboss the ornamentation 26 on the decorative paste composition 16. In the alternative, the decorative paste composition 66 may be applied upstream of design roller 66 by hand feed. In any event, the process according to invention is generally adapted to employ such and other application methods known in the art.

Returning to FIG. 3, a finished molding strip 12 exits downstream of the design roller 68. The molding strip 12 may be pulled from the composition application station 80, folded and/or cut. Any excess paste composition or fiberboard may be recycled through the process. Thereafter, individual lengths of finished molding strip 12 are removed from the composition application station 80 and laid across a drying rack (not shown). The drying step is intended to allow the composition to permanently dry and set to the front surface 22 of the fiberboard 12. Since the preferred process utilizes a "cold" paste composition 66, the time required for drying of the lengths of molding strip 12 is minimized.

Typically, the finished molding strip 12, according to the invention, is ready for use after a 24-hour drying period. In addition, the deformation problems (e.g, bowing and shrinkage) which may be associated with typical "hot" compositions during the drying step is minimized or eliminated.

Although one or more embodiments of the present invention has been shown or described, alternate embodiments will be apparent to those skilled in the art and are within the intended scope of the present invention. Therefore, the present invention is to be limited only by the claims.

What is claimed is:

1. A method of making a molding, said method comprising the steps of:
    providing a fiberboard substrate;
    providing a decorative paste composition; and
    setting the decorative paste composition to a surface of the fiberboard substrate.

2. The method of claim 1, further comprising the step of providing a mechanical roller and wherein the setting step includes applying the paste composition to the surface of the fiberboard substrate and rolling the mechanical roller against the paste composition to press the paste composition against the surface of the fiberboard substrate.

3. The method of claim 2, wherein the mechanical roller is a design roller and the rolling step produces an ornamentation on the paste composition.

4. The method of claim 1, wherein the step of providing a fiberboard substrate is preceded by the step of:
    molding a plurality of fiberboard materials into an elongated fiberboard member having a desired shape.

5. The method of claim 4, further comprising the step of:
    extruding the elongated fiberboard member before the setting step.

6. The method of claim 5, wherein the extruding step includes applying a whiting coating on the elongated fiberboard member.

7. The method of claim 1, wherein the setting step includes applying the paste composition on a surface of the fiberboard substrate, when the paste composition is at ambient temperature.

8. The method of claim 1, wherein the step of providing a paste composition includes,
    providing a quantity of polyvinyl acetate;
    providing a quantity of fillers; and
    mixing the ingredients together under ambient conditions.

9. The method of claim 8, wherein the step of providing a quantity of fillers includes selecting a filler from the group of fillers including wood fillers and shell fillers.

10. The method of claim 1, wherein the step of providing a fiberboard substrate includes providing a fiberboard substrate formed substantially from medium-density fiberboard.

11. An ornamental molding comprising:
    a fiberboard substrate having a surface; and
    a paste composition adhered to said surface of said fiberboard substrate, said composition having an outer surface that exhibits an ornamental design.

12. The molding of claim 11, wherein said ornamental design includes a profile exhibited by said outer surface.

13. The molding of claim 11, wherein said paste composition exhibits a wood grain appearance.

14. The molding of claim 11, wherein said paste composition comprises polyvinyl acetate and fillers.

15. The molding of claim 14, wherein said fillers are selected from the group of fillers including wood fillers and shell fillers.

16. The molding of claim 11, wherein said fiberboard substrate is an elongated extruded member.

17. The molding of claim 11, wherein said fiberboard substrate is formed substantially from medium-density fiberboard.

18. A method of making an ornamental molding, said method comprising the steps of:

provide a fiberboard substrate;

providing a paste composition;

applying the paste composition to a surface of the fiberboard substrate; and pressing the paste composition against the surface of the fiberboard substrate, such that the paste composition adheres to the surface of the fiberboard substrate and an ornamentation is formed on an outer surface of the paste composition.

19. The method of claim 18, further comprising the step of:

providing a mechanical roller, and wherein the pressing step includes rolling the mechanical roller against the composition to press the composition against the surface of the fiberboard substrate.

20. The method of claim 19, wherein the mechanical roller is a design roller and the rolling step produces an ornamental design on the paste composition.

21. The method of claim 18, wherein the applying step includes applying the paste composition when the paste composition is at ambient temperature.

22. The method of claim 21, wherein the step of providing the paste composition is preceded by the steps of:

providing a plurality of ingredients for the paste composition, the ingredients including a quantity of polyvinyl acetate and a quantity of fillers; and mixing the ingredients together at ambient temperature to form the paste composition, whereby the paste composition exhibits a wood grain appearance.

23. The method of claim 22, wherein the step of providing the ingredient includes selecting a filler from the group of fillers including wood fillers and shell fillers.

24. The method of claim 23, wherein the step of providing a plurality of ingredients includes providing a quantity of polyvinyl acetate.

25. The method of claim 18, further comprising the steps of:

molding a plurality of fiberboard materials into an elongated fiberboard member; and extruding the elongated fiberboard member to apply a coating on the fiberboard member.

26. The method of claim 25, wherein the extruding step includes the step of applying a whiting coating on the fiberboard member.

27. The method of claim 18, wherein the step of providing a fiberboard substrate includes selecting a fiberboard substrate formed substantially from medium-density fiberboard.

* * * * *